United States Patent [19]

Lang

Best Available Copy

[11] E Re. 30,758

[45] Reissued Oct. 6, 1981

[54] PEDAL-ACTUATED BICYCLE GEAR SHIFT MEANS

[76] Inventor: Richard A. Lang, 610 18th St., South, Arlington, Va. 22202

[21] Appl. No.: 966,474

[22] Filed: Dec. 14, 1978

Related U.S. Patent Documents

Reissue of:

[64] Patent No.: 4,061,046
Issued: Dec. 6, 1977
Appl. No.: 720,396
Filed: Sep. 3, 1976

[51] Int. Cl.[3] ..... F16H 7/22; B62M 9/00

[52] U.S. Cl. ..... 474/80; 74/594.4; 74/594.6; 280/236

[58] Field of Search ..... 74/217 B, 242, 594.4, 74/594.6; 280/236, 237, 238, 261; 417/229, 231, 234, 903; 474/80

[56] References Cited

U.S. PATENT DOCUMENTS

| | | | |
|---|---|---|---|
| 2,024,499 | 12/1935 | Baron | 74/594.4 |
| 2,435,928 | 2/1948 | Matulich | 417/234 |
| 3,402,942 | 9/1968 | Shimano et al. | 280/236 |
| 3,613,466 | 10/1971 | Houghton | 74/217 B |
| 3,732,787 | 5/1973 | Yamaguchi | 192/142 R |
| 3,742,777 | 7/1973 | Mathauser | 74/242.3 |
| 3,830,521 | 8/1974 | Gardel et al. | 280/236 |
| 3,873,128 | 3/1975 | Dunder et al. | 280/236 |
| 3,919,896 | 11/1975 | Foster | 74/594.6 |

*Primary Examiner*—C. J. Husar
*Assistant Examiner*—Conrad Berman
*Attorney, Agent, or Firm*—Warren N. Low

[57] ABSTRACT

In bicycles having multi-speed gear arrangements, the automatic shifting of *the sprocket chain controlling the* gears *is* in response to foot pedal pressures *and* is effected by fluid or electrical connections from the pedals to the [gear-changing] *chain-shifting* mechanism, thereby to impart full foot control to shifting with resultant improved pedaling cadence and bicycling comfort.

14 Claims, 5 Drawing Figures

PEDAL-ACTUATED BICYCLE GEAR SHIFT MEANS

Matter enclosed in heavy brackets [ ] appears in the original patent but forms no part of this reissue specification; matter printed in italics indicates the additions made by reissue.

BACKGROUND OF THE INVENTION

The increasing popularity of bicycling in recent years has led to the profusion of bicycles equipped with variable speed transmissions that permit changing the gear ratio between the pedal sprocket [powered] and the drive sprocket of the rear wheel. A number of such gear shift arrangements are well known in the art and are commonly seen in ten-speed form and less frequently in five-speed or three-speed selectability.

Conventionally, the gears are shifted between the several ratios by means of manual selector levers operable through cables and mechanical linkage. More recently, there have been developed diverse means for effecting both automatic shifting of the gears without manual or hand operation of a lever, as well as fluid operated shifting devices, thereby to eliminate certain complexities of mechanical cable and linkage arrangements of the *chain* derailleur or other multi-speed bicycle gear changing assembly.

Developments of this type are seen illustratively in recent U.S. Pat. Nos. to Mathauser 3,742,777, Houghton 3,613,466, Dunder et al 3,873,128, Gardel 3,830,521 and Yamaguchi 3,732,787.

SUMMARY OF THE INVENTION

The present invention pertains specifically to improved means for effecting shifting of multi-speed bicycle gear sets and is particularly characterized by unique foot actuation thereof through the bicycle pedals. In the disclosed forms of the invention, the gears may be shifted either by hydraulic pressure means or by an electrical circuit arrangement as will be set forth more fully hereinafter.

In either event, shifting is effected automatically either to a higher or lower ratio in response to relative pressure of the foot upon the pedal, whereby the ratio can readily automatically adjust as desired depending upon terrain, traffic, or other pedaling conditions encountered.

Such foot or pedal shifting control enhances smooth pedaling by the operator with the [developments] *development* of maximum cycling stamina and durability through a smooth cadence or rhythm of pedaling in turn enhanced by proper ankling of the pedals as the drive sprocket revolves. In this manner, the operator's feet are enabled to uniquely control the bicycle wherein [gear] *chain* shifting occurs to the maximum benefit of the operator while his hands remain completely free for directional control, signalling and other necessary operations.

Further, the pedal-controlled automatic [gear] *chain* shift system may be deactivated at the will of the operator while riding so as to leave the gear ratio at a selected point, as in high gear.

BRIEF DESCRIPTION OF THE DRAWINGS

Other features of the invention will become evident from the following description taken with the accompanying drawings in which.

BRIEF DESCRIPTION OF THE PREFERRED EMBODIMENT

Figure 1:
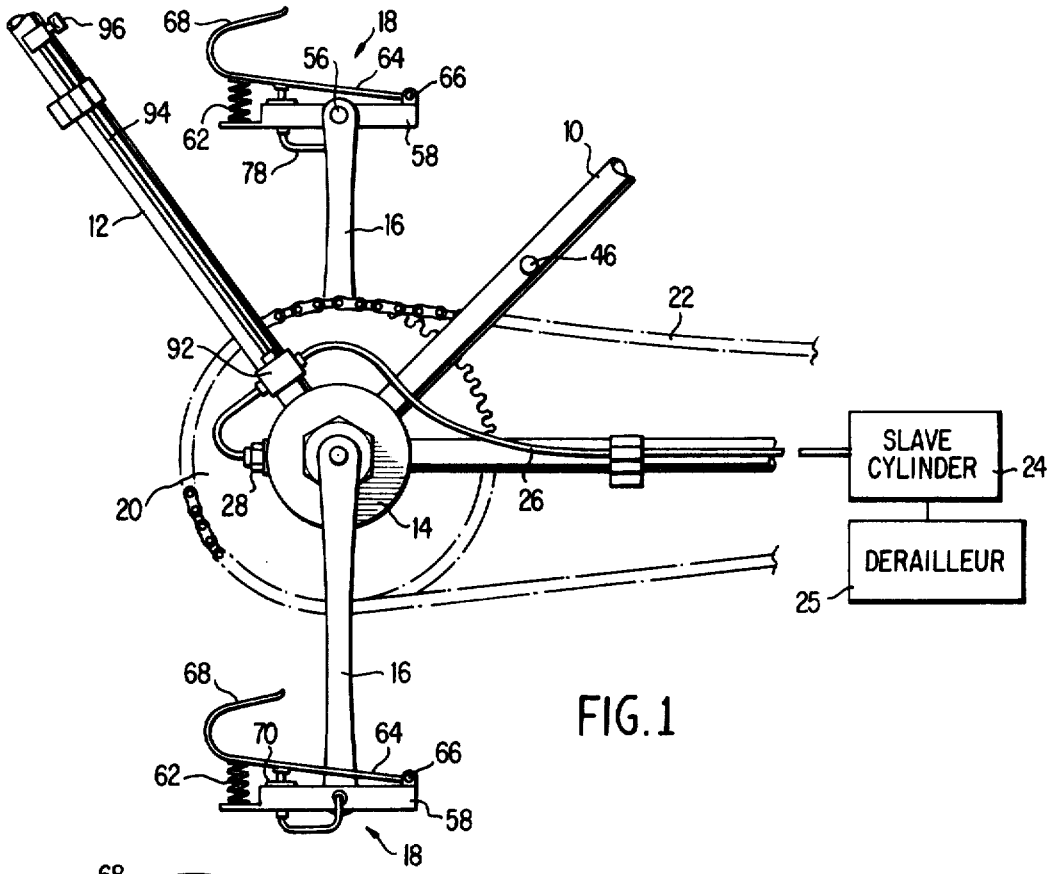
FIG. 1 is a fragmentary side elevation of the pedal and sprocket assembly in a preferred form of the invention utilizing hydraulic control.

There is shown in FIG. 1 the crank, pedal and drive sprocket area of a conventional bicycle, including the usual frame members 10, 12 which are secured as by welding to pedal crank hub 14 through which and from which cranks 16 conventionally extend and to which are respectively attached novel pedals 18 of the invention.

The crank 14 also conventionally mounts a drive sprocket of any desired form as at 20 which through sprocket chain 22 communicates with the multi-speed gear set on the rear axle, not shown. The multi-speed gear set is likewise of conventional form, such as a well known derailleur type and forms no part of the present invention. Reference thereto may be had for a full understanding of the same in a number of prior art patents, an exemplary one of which is Mathauser U.S. Pat. No. 3,742,777. Illustratively, movement of the gear shifting control arm in one direction successively changes the gear ratio while a spring seeks to return the control arm to an initial position.

As will be seen in the aforesaid Mathauser patent, shifting of the gears at the rear axle is effected by a fluid-actuated slave cylinder acting upon a gear shifting control arm or the like which cylinder is diagrammatically illustrated at 24 in FIG. 1 and which cylinder may be constructed in accordance with the teachings of Mathauser and likewise forms no part of the present invention.

In accordance with the present invention, however, [hycraulic] *hydraulic* fluid controls operation of the slave cylinder 24 and is applied thereto through a fluid line 26 extending from the slave cylinder to the crank hub 14, being secured to the hub by a conventional compression or like fitting 28.

Figure 2:
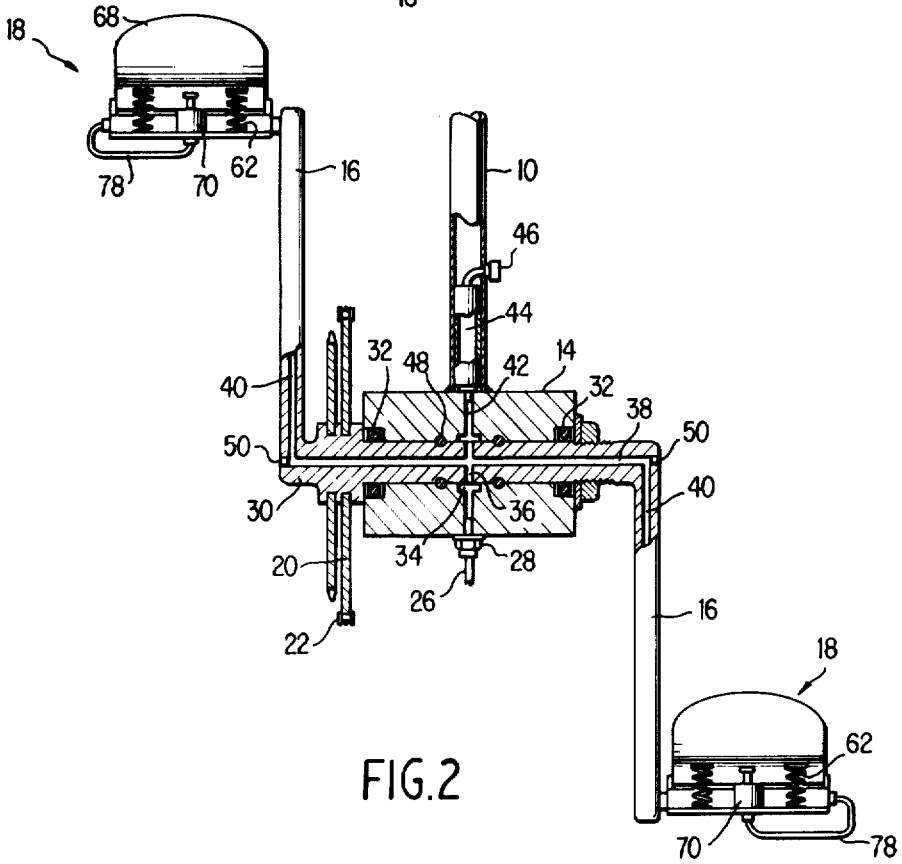
FIG. 2 is a front elevation, partly in section, of the sprocket and pedal assembly particularly illustrating fluid connections from the pedal crank.

As seen in more detail in the sectional view of FIG. 2, the pedal cranks 16, 16 are formed integral with and are connected by crank axle 30 which extends through the hub 14 and is journaled therein for free rotation in the usual manner, as by ball bearing races 32 at either end of the hub 14.

The crank hub 14 is radially ported at 34 to communicate with fluid line 26 from slave cylinder 24, the port communicating with a plurality of radial bores 36 in the crank axle which commonly intersect a transverse bore 38 therein. Bore 38 in turn at either end thereof in the illustrated embodiment communicates with further bores 40 extending through the cranks 16 to the connection with the pedals 18.

Additionally, a radial bore 42 in the crank hub communicates with a fluid reservoir container 44 received within the tubular frame member 10. The reservoir is preferably provided with access means such as a capped opening 46 extending through the frame member 10 whereby the reservoir may be filled or the residual fluid level checked therein as desired. The lower end of the reservoir receptacle 44 is press-fitted or otherwise secured in leakproof relation to the radial bore 42 in the crank hub.

It will be seen therefore that hydraulic fluid from reservoir 44 in the crank arm and axle may communicate freely through the respective bores and directly through line 26 to the slave cylinder 24 for [change gear] *chain shift* purposes.

Conventional means such as O-rings or C-shaped seals are provided as at 48 between the crank axle 30 and the crank hub 14 to eliminate or minimize fluid leakage from the closed system through the pedal crank.

Figure 3:
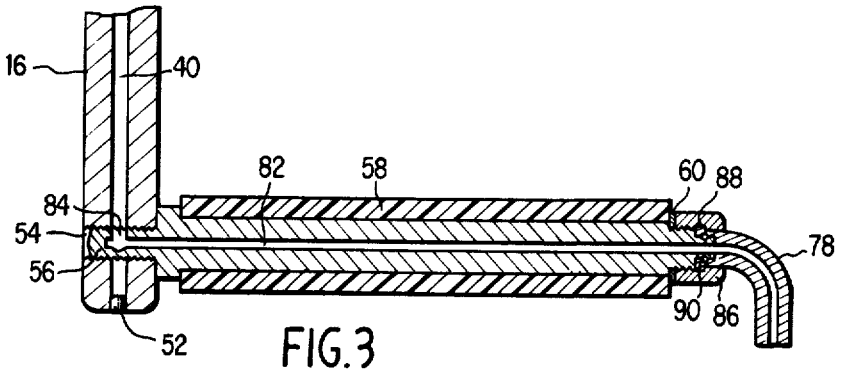
FIG. 3 is a fragmentary elevation on an enlarged scale of the pedal connection to the crank.
Figure 4:
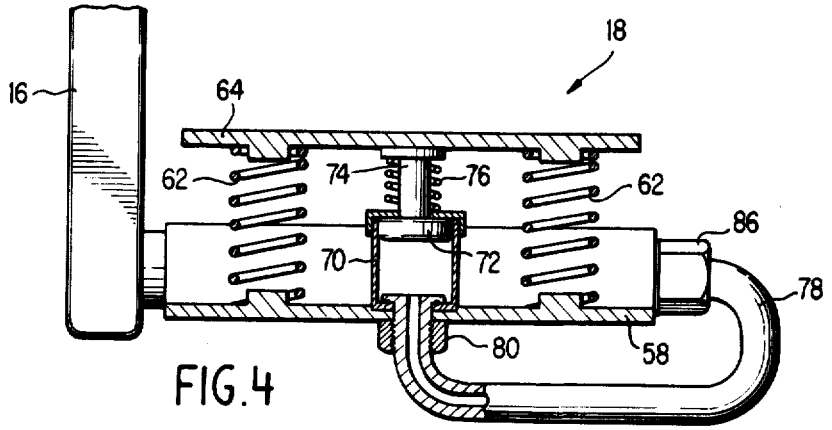
FIG. 4 is an enlarged illustration, partly in section, of the forward end end of the pedal.

In the illustrated form of the invention, the crank axle bore 38 may be readily formed by casting or drilling with the terminal ends thereof permanently or detachably plugged as at 50. Likewise, the radially extending bores 40 in the crank arms 16 may be suitably plugged at 52, FIG. 3.

Conventionally secured, as by threads within a bore 54, to each crank 16 is a pedal frame 58 and which may be releasably retained upon bar 56 as by a washer or clip 60. The pedal assembly 18 uniquely carries the fluid control system for the automatic [gear] *chain* shift wherein pedal frame 58 mounts at the forward end thereof a pair of pedal plate springs 62 which extend between the pedal frame 58 and the pedal plate 64 and serve to [eleviate] *elevate* the forward end thereof as seen. The rear portion of pedal plate 64 is pivotally secured to the pedal frame 58 at 66 whereby it will be seen in FIG. 1 that springs 62 normally maintain the forward end of the pedal plate slightly elevated whereby the same may be depressed against the force of the springs.

The pedal plate 64 may be reversely curved as at 68 so as to provide a toe-receiving area thereby to permit the operator's feet to remain detachably coupled with the pedals to facilitate smooth ankling of the pedals with resultant improved cadence of operation.

Pedal frame 58 further carries master cylinder 70 which includes a depressible piston 72 having actuator rod 74 extending upwardly therefrom into engagement beneath pedal plate 64. A spring 76 may encircle rod 74 so as to maintain the piston 72 normally elevated.

Master cylinder 70 is provided with a fluid line 78 secured thereto in fluid-sealed relation and wherein coupling nut means illustrated at 80 may thereby secure the master cylinder 70 and the fluid line 78 to the pedal frame. Fluid line 78 extends to and is rotatably coupled with the external end of pedal bar 56 which is axially and radially bored at 82, 84 to communicate with crank bore 40. Illustratively, fluid line 78 may be rotatably secured to rod 56 as by an internally shouldered nut 86 engaging a radial face of a flange 88 of the fluid line, the nut 86 being threaded to pedal rod 56. Suitable seal ring means 90 may be provided between the relatively rotating members 78 and 56 so as to prevent leakage [there through] *therethrough*.

With this construction, it will be seen that as the operator pedals the bicycle thereby rotating the drive sprocket 20, fluid communication will be maintained between a master cylinder 70 of either pedal and the slave cylinder 24 by means of the series of intercommunicating bores. In like manner, terrain-demanded pressure of the ball of the operator's foot upon pedal plate 64 will cause a greater or lesser movement of master piston 72, the fluid passing through communicating fluid lines to the slave cylinder 24, thereby to effect the desired gear ratio shift up or down at the rear axle in accordance with the teachings of the Mathauser patent thereat, for example, or the operator may apply pressure [as desired] to the pedal to effect a desired gear change.

While I have illustrated each pedal assembly 18 and its associated crank as being provided with the necessary hydraulic devices, thereby achieving both redundancy and greater control of the shifting operation with either foot, only a single pedal 18 may be so provided and all shifting effected by the single pedal.

Further, in order to disable the hydraulic control system while still permitting full mechanical sprocket drive in the usual manner, the fluid line 26 is interrupted at 92 adjacent frame member 12 with a shut-off means such as a simple rotary valve, which may be manually actuated through elongated rod 94 secured to frame 12 and provided with a thumb lever 96.

Figure 5:
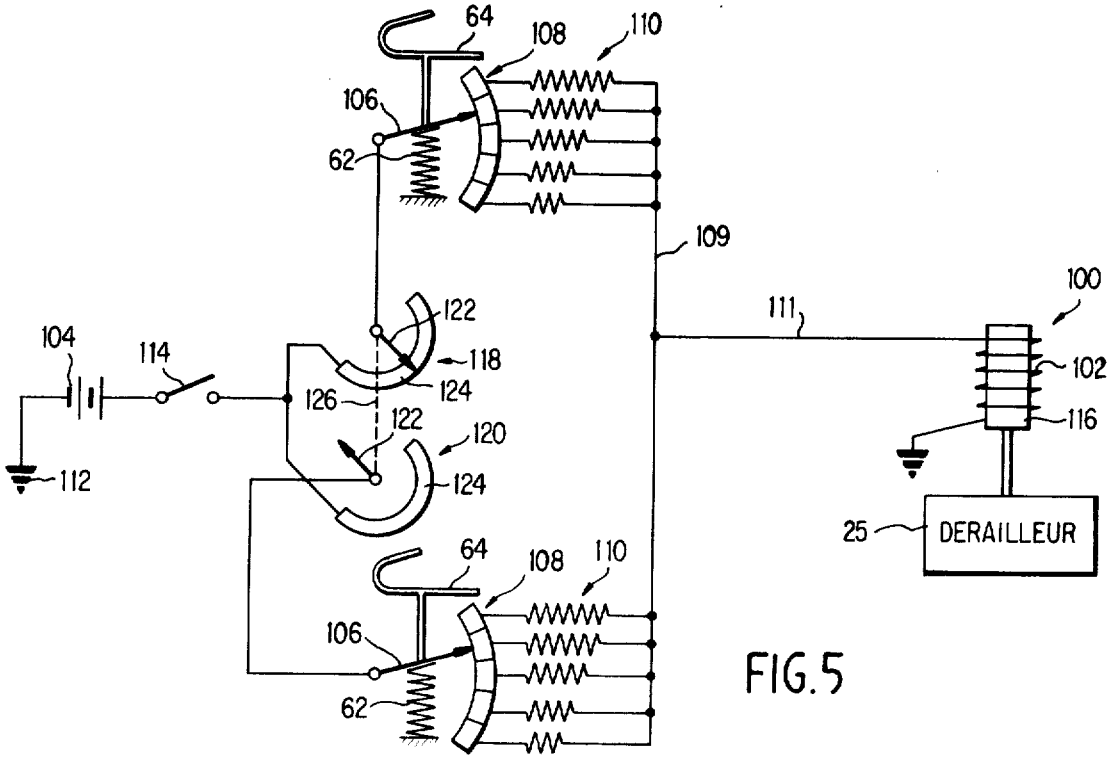
FIG. 5 is a diagrammatic view of an alternate embodiment of the invention utilizing foot-controlled electrical [gear] *chain* shifting.

A modification of the invention is seen in FIG. 5 wherein automatic *chain* shifting [of gears] of the bicycle is effected by simple electrical means rather than the hydraulic means of the principal embodiment. In this form of the invention, the pedals 64 along with their pivot mounting 66 [is] *are* retained and the return springs 62 therefor. Otherwise, apart from requisite electrical connections to be noted, all other aspects of the operating bicycle are conventional and [of course] all fluid lines, bores, and seals [therefore] *therefor* as in the preferred embodiment are eliminated. That is to say, with the pedal-controlled electrical gear change actuator, only a modified controllable pedal 64 need be employed along with the requisite electrical circuitry and the bicycle not otherwise need [by] *be* modified.

Thus, as seen in FIG. 5, a solenoid 100 controls shifting of the conventional derailleur 25 wherein the solenoid 100 is substituted for the fluid cylinder 24, for example, in the principal embodiment. Depending upon the current flow through the solenoid windings 102, the solenoid core 116 will be displaced a greater or lesser amount to thereby shift the bicycle into the appropriate gear *ratio* in accordance with the axial movement thereof.

Power to operate the electrical system of this embodiment comes from a suitable power source such as battery 104 carried by the frame or by a wheel-driven generator. Obviously, a wheel-driven generator may be used in conjunction with a battery thereby to maintain the battery in charged condition.

Associated with and operated by pedal plate 64 of each pedal is a moveable arm 106 of a rheostat and it will be seen that as downward pressure is applied to pedal plate 64, the same will shift the rheostat arm 106 along its respective series of spaced contacts 108.

In substantially conventional form, each of the separate contacts of strip 108 are associated with diverse resistances 110 of progressively decreasing resistance values. Thus [is] *it* will be seen, that with the battery [grouded] *grounded* at 112, and master switch 114 closed by the bicyclist, the extent of pedal plate movement will determine the position of arm 106 and thereby by virtue of the particularly selected resistance of the group 110, a relatively greater or lesser current will flow from the battery through the selected resistance and lines 109, 111 to the solenoid 100 thereby to displace the core 116 thereof and shift the bicycle [gears] *chain*.

Further, as on the down stroke of the pedals it is often necessary that significantly greater force be applied by the bicyclist when accelerating or climbing a hill and which would thus tend to shift the resistance values to the limit of the rheostat and in the direction of lower gear ratios, it is preferred that the bicyclist's feet alternately control the rheostat position, that is to say, on the downstroke of each pedal through substantially one-half of its circle of rotation when the bicyclist is exerting pumping or pedaling pressure thereon, the downswinging pedal is thus controlled by the bicyclist's foot to maintain the desired gear *ratio* while the opposite upwardly moving pedal at this time is disengaged from the electrical circuit. To this end and as seen in FIG. 5, a plurality of wiper switches 118, 120 are provided, one associated with each pedal. Most conveniently, the wiper switches are associated with the crank hub and the wipers of each switch are ganged as shown in dashed lines and are 180 degrees out of phase. Thus, in the position shown in FIG. 5 and with switch 114 closed, current would flow through the upper illustrated rheostat 110 controlled by that pedal 64 on the downstroke inasmuch as wiper 122 arm is in contact with the arcuate or semicircular contact 124 thereof. At that time and associated with the opposite pedal which is on the upstroke, the wiper 122 of switch 120 is moving through the 180° portion of its travel out of contact with its associated arcuate contact 124. Thus, when the pedal associated with the upper rheostat 110 in FIG. 5 reaches the approximate 6 o'clock position and commences its up travel, its wiper 122 will leave its contact 124 thereby breaking circuit with that rheostat, but substantially immediately therewith, the wiper 122 associated with the lower switch 120 and the now descending pedal will engage its contact 124 to maintain the desired solenoid current at 100 depending upon the pressure selectively exerted upon the descending pedal.

While I have illustratively considered the switchover point for pedal control to be at about the 6 o'clock position, it is evident that in practice the switchover point might be shifted to another position, as at 7 or 8 o'clock by relative rotative repositioning of contacts 124 (or wipers 122). Indeed, means permitting manual rotative adjustment thereof by the operator when stationary or in motion (somewhat in the character of a manual spark advance in a gasoline engine) may optionally be provided.

While I have shown as an operative form of electrical control a rheostat having five varying resistance elements, it is obvious that as many resistance elements may be employed for appropriate conventional interconnection thereof as is necessary to accommodate the number of gears to be shifted by the derailleur, as three, five, or [10] *ten*. Obviously, in lieu of resistance elements, arranged as shown, other resistance arrangements or electrical means might be employed achieving the same results within the scope of the invention.

I claim:

1. In a bicycle provided with front and rear sprockets defining multiple gears and a drive chain extending therebetween, *a pair of foot pedals*, a shifting mechanism, means to effect shifting of the chain with respect to the gears, the improvement comprising:

means cooperatively associated with the foot pedals of the bicycle for controlling the [gear-shifting] *chain-shifting* means, said [pedal] *pedal-associated* means including moveable elements on [the] *a* pedal whereby movement of [the pedal] *said moveable elements* to any one of a plurality of preselected positions *by the application of varying foot pressure* will effect the requisite shifting of the chain with respect to the gears.

2. The improved chain shifting means of claim 1 wherein said [pedal]*pedal-associated* means includes a fluid cylinder mounted on [the] *a said* bicycle pedal having a piston extending therefrom, a foot-engaged pedal plate on said pedal for shifting said piston, and a hydraulic line extending from said pedal-mounted cylinder to said shifting means, wherein said shifting means includes a *further* fluid cylinder connected to said line.

3. The improved chain shifting means of claim 2 wherein said foot-engaged pedal plate is normally urged away from said [master] *fluid* cylinder by yieldable means which is overcome by foot pressure thereagainst.

4. The improved chain shifting means of claim 3 wherein said [pedal] *pedal-associated* means includes a frame carrying said [master] *fluid* cylinder and said yieldably supported pedal plate is pivotally mounted on said frame.

5. The improved chain shifting means of claim 2 wherein said pedals are journalled for rotation on the crank arms of the bicycle and wherein said hydraulic line includes a swiveling connection between said [pedal] *pedals* to a fluid conduit associated with said crank arm.

6. The improved chain shifting means of claim 2 wherein each said pedal [means] of the bicycle is provided with a said fluid cylinder and hydraulic line connections commonly connected to said [gear] shifting *further* fluid cylinder.

7. The improved chain shifting means of claim 2 further including a valve to block flow to and from said pedal *fluid* cylinder thereby to disable said fluid-controlled [gear] *chain* shift operation.

8. The improved chain shifting means of claim 2 including a hydraulic fluid reservoir communicating with said hydraulic line.

9. The improved chain shifting means of claim 8 wherein said reservoir is disposed within a frame member of the bicycle and communicates with said hydraulic line at the crank axle hub of the bicycle.

10. The improved chain shifting means of claim 2 wherein said hydraulic line extends through the crank arms and crank hub of the bicycle.

11. The improved chain-shifting means of claim 1 wherein said [gear-shifting] *chain-shifting* means is electrically actuated.

12. The improved [gear-shifting] *chain-shifting* means of claim 11 wherein an electric solenoid effects shifting of said [gears] *chain* and wherein said movement of said [pedals] *moveable elements* regulate current to the said [gear-shifting] *chain-shifting* solenoid thereby to determine the extent of movement thereof in shifting the [gears] *chain*.

13. The improved [gear-shifting] *chain-shifting* means of claim 12 wherein a plurality of resistance elements are provided for each said foot pedal and wherein movement of said [foot pedal] *moveable ele-*

*ments* selects a predetermined resistance element thereby to control [gear-shifting] *chain-shifting* movement of said solenoid.

14. The improved [gear-shifting] *chain-shifting* means of claim 13 wherein alternate sequential switch means are provided for each said foot pedal thereby to disable the electrical system of each pedal during a portion of its rotation.

* * * * *